United States Patent [19]
Aoshima et al.

[11] Patent Number: 5,815,519
[45] Date of Patent: Sep. 29, 1998

[54] ULTRASHORT PULSE LASER APPARATUS

[75] Inventors: Shinichiro Aoshima; Haruyasu Ito; Yutaka Tsuchiya, all of Hamamatsu, Japan

[73] Assignee: Hamamatsu Photonics, K.K., Hamamatsu, Japan

[21] Appl. No.: 799,656

[22] Filed: Feb. 11, 1997

[30] Foreign Application Priority Data

Mar. 25, 1996 [JP] Japan ................................ 8-068725

[51] Int. Cl.⁶ ............................................ H01S 3/10
[52] U.S. Cl. ........................ 372/25; 372/18; 372/26; 372/27; 372/32; 372/34; 372/100; 372/103; 372/107
[58] Field of Search ........................ 372/100, 93, 18, 372/25, 26, 27, 32, 34, 94, 103, 107

[56] References Cited

U.S. PATENT DOCUMENTS 5,553,093  9/1996  Ramawamy et al. .................. 372/25
5,602,677  2/1997  Tournois ................................ 372/25

OTHER PUBLICATIONS

Nov. 1986/vol. 11. No. 11/ Optics Letters "Variable Intracavity Spectral Windowing in a SyNchronously Pumped Femtosecond CW Dye Laser" Martin D. Dawson et al, pp. 721–723.
Optics Letters/vol. 20, No. 11/Jun. 1, 1995 "Kerr–Lens Mode–Locked Diode–Pumped Cr: LISGAF Laser" V.P. Yanovsky et al, pp. 1304–1306.
Optics Letters/vol. 19, No. 14/Jul. 15, 1994 "Self–Starting Kerr–Lens Mode Locking of a TI:Sapphire Laser", G. Cerullo et al, pp. 1040–1042.
The Review of Laser Engineering, vol. 23, No. 11 Nov. 1995, pp. 996–1001, 1995 the Laser society of Japan, vol. 23, No. 11 (1995) "44 FS Pulse Generation From an All–Solid State CR:LISAF Laser" Shin–ichiro Aoshima et al, pp. 89–96.
Optics Letters/vol. 19, No. 21/Nov. 1, 1994 "Compact Dispersion–Conpensating Geometry for Kerr–Lens Mode–Locked Femtosecond Lasers", M.Ramaswany–Paye et al, pp. 1756–1758.
Optics Letters/vol. 21, No. 2/Jan. 15, 1996 "Compact Kerr–Lens Mode–Locked Resonators", B.E. Bouma et al, pp. 134–136.

*Primary Examiner*—James W. Davie
*Attorney, Agent, or Firm*—Cushman Darby & Cushman IP Group of Pillsbury Madison & Sutro LLP

[57] ABSTRACT

An ultrashort pulse laser apparatus of the this invention includes (1) a laser medium, (2) a laser resonator which stores the laser medium and externally extracts a laser beam, and (3) an excitation source for outputting an excitation energy to the laser resonator to excite the laser medium. The laser resonator includes (i) a plurality of resonant mirrors disposed on both sides of the laser medium to form a resonant optical path, and (ii) a phase dispersion compensation unit which includes two optical members respectively arranged on two light input/output surface sides of the laser medium on the resonant optical path and compensates phase dispersion of light in the resonant optical path. That is, the laser medium is disposed in the optical path between the two optical members of the phase dispersion compensation unit. With this arrangement, even when the laser medium is arranged almost at the center of the laser resonator to stabilize mode locking, the cavity length of the resonant optical path can be reduced. Therefore, the repetition frequency of laser pulses can be increased, and simultaneously, size reduction of the laser apparatus itself can be achieved.

22 Claims, 18 Drawing Sheets

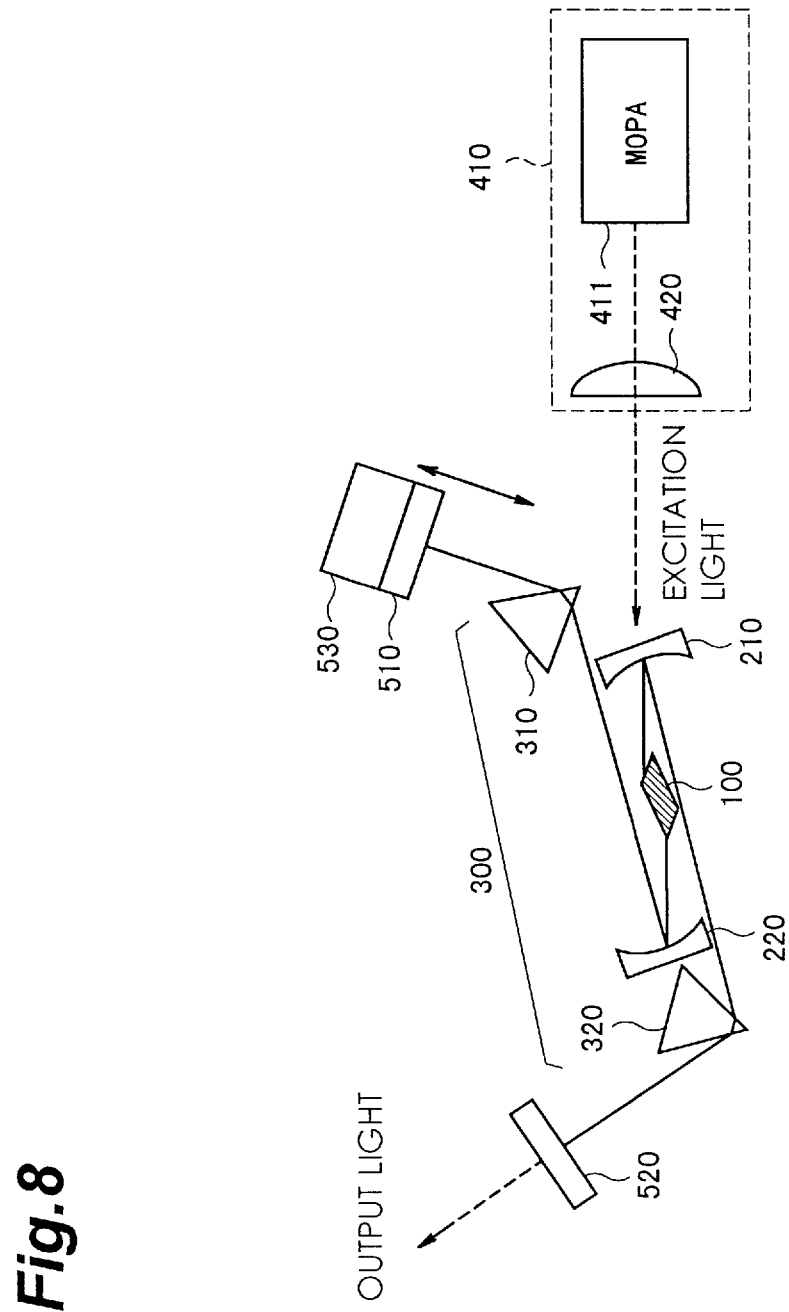

MASTER OSCILLATOR UNIT
430

POWER AMPLIFIER UNIT
431

MASTER OSCILLATOR UNIT   441
440   POWER AMPLIFIER UNIT

ULTRASHORT PULSE LASER APPARATUS

BACKGROUND OF THE INVENTION

1. Field of the Invention

The present invention relates to an ultrashort pulse laser apparatus for generating an optical pulse having a pulse width of 1 psec or less.

2. Related Background Art

A strong demand for short pulse light has arisen from the viewpoint of high-speed optical communication and applications of high-speed nonlinear optical phenomena. To meet this demand, various techniques of generating an ultrashort pulse of 1 psec or less have been proposed.

For example, a technique of generating an optical pulse having a pulse width of 100 to 500 fsec on the basis of passive mode locking by using a dye medium as a laser medium as well as a saturable dye is described in a reference "M. D. Dawson et al., OPTICS LETTERS, Vol. 11, No. 11, Nov. 1986, pp. 721–723". This technique will be referred to as prior art 1 hereinafter.

Another technique of generating an optical pulse having a pulse width of 44 fsec on the basis of self-mode locking by using a solid medium as a laser medium, and the nonlinear optical effect of the solid laser medium itself is described in a reference "Aoshima et al., The Review of Laser Engineering, Vol. 23, No. 11 (1995), pp. 90–95". This technique will be referred to as prior art 2 hereinafter.

An ultrashort pulse laser apparatus according to each of these techniques has a laser resonator in which a laser medium, a pulse generation unit, and a phase dispersion compensation unit are disposed between two resonant mirrors. The laser medium is excited by an energy from an excitation source and performs a laser operation. In prior arts 1 and 2, the excitation energy is supplied to the laser medium in the form of light. Particularly, in prior art 2, a semiconductor laser is used as the excitation source.

In the conventional laser apparatus, one resonant mirror also serves as a light extraction unit. In the following description, the resonant mirror which also serves as a light extraction unit will be referred to as an output mirror. Another resonant mirror having a reflectance higher than that of the output mirror will be simply referred to as a resonant mirror.

Mode locking is preferably used for pulse generation by the ultrashort pulse laser apparatus. Mode locking methods are roughly classified into (i) active mode locking by a mode locking unit using an AO (Acousto-Optic) device, (ii) passive mode locking using a saturable absorber, such as a dye used in prior art 1 and a semiconductor having an MQW (Multi-Quantum Well) structure, and (iii) self-mode locking using a nonlinear optical effect of a laser medium itself, like prior art 2.

A pulse generation unit for executing a mode locking method employed from the above methods is disposed in the laser resonator. When self-mode locking is to be executed, the laser medium commonly serves as the pulse generation unit.

To generate ultrashort pulses along the time axis, the frequency band inevitably becomes wide along the frequency (or wavelength) axis. Therefore, the product value of a full-width at half maximum (FWHM) $\Delta v$ of the bandwidth along the frequency (or wavelength) axis and an FWHM $\Delta \tau$ of the pulse width along the time axis is not a predetermined value or less. More specifically, relation (1) is established:

$$\Delta v \cdot \Delta \tau \geq k \tag{1}$$

where $\Delta v$: FWHM along the frequency (or wavelength) axis $\Delta \tau$: FWHM along the time axis k: constant depending on the waveform Assuming that the phases ideally match between the wavelengths, $$\Delta v \cdot \Delta \tau = k$$

For example, when the waveform of the optical pulse is $\text{sech}^2$, k=0.315.

The laser medium, the pulse generation unit, the resonant mirror, and the output mirror which are essential for the pulse laser apparatus are generally dispersive media. Because of these dispersive media, laser oscillation is performed within a limited wavelength band, or even in laser oscillation within a wide bandwidth, an optical pulse having a desired pulse width can hardly be obtained.

To solve these problems, normally, a phase dispersion compensation unit is disposed in the laser resonator. A prism pair or a diffraction grating pair are preferably used as the phase dispersion compensation unit. In prior art 1 or 2 as well, a prism pair are disposed as the phase dispersion compensation unit in the resonator.

To stabilize mode locking in the ultrashort pulse laser apparatus, the laser medium must be arranged almost at the center of the laser resonator, as is known. Such a finding is described in, e.g., a reference "G. Cerullo et al., OPTICS LETTERS, Vol. 19, No. 14, Jul. 15, 1994, pp. 1040–1042).

The typical conventional ultrashort pulse laser apparatus comprises (a) a laser medium consisting of a Cr:LiSAF crystal, (b) a first concave mirror arranged on one light input/output surface side of the laser medium, and a second concave mirror arranged on the other light input/output surface side of the laser medium and separated from the above first concave mirror by about 10 cm on the optical path, and (c) a phase dispersion compensation unit having two prisms which consist of BK7 and are separated from each other by a distance of 46 cm.

This apparatus also comprises (d) a slit through which a component of light in the laser resonator is selectively transmitted, (e) a resonant mirror which forms one end face of the laser resonator, and an output mirror which is separated from the resonant mirror by 170 cm on the optical path and forms the other end face of the laser resonator, (f) a vibration device for vibrating the output mirror, and (g) an excitation source for supplying an excitation energy to the laser medium.

In this apparatus, an excitation energy is supplied from the excitation source to the laser medium to cause laser oscillation. The output mirror is vibrated by the vibration device to generate an intensity fluctuation which initiates mode-locked state, thereby obtaining ultrashort pulses.

According to an experiment by the present inventor, when this conventional ultrashort pulse laser apparatus was used, and optimum adjustment was performed, an optical pulse having a peak wavelength of about 908 nm and a pulse width of 30 fsec was obtained. As the result of this experiment, $$\Delta v \cdot \Delta \tau = 0.32$$

which almost equals an ideal value, assuming that the time waveform is $\text{sech}^2$, i.e.:

$$\Delta v \cdot \Delta \tau \, 0.315$$

In the conventional ultrashort pulse laser apparatus, however, when the distance between one prism of the phase dispersion compensation unit and one concave mirror is reduced to, e.g., almost 0 cm, to reduce the cavity length L, the cavity length L is reduced to a minimum of 102 cm. In this case, the repetition frequency f of laser pulses becomes about 147 MHz.

SUMMARY OF THE INVENTION

For optical pulses generated by the ultrashort pulse laser apparatus, the time interval between pulses is required to be short, i.e., there is a demand for a higher repetition frequency of optical pulses, in addition to the demand for a small pulse width. Furthermore, a demand has arisen for size reduction of the apparatus itself and variable control of the repetition interval of pulses.

The repetition time interval of laser pulses, i.e., a time interval of circulation of light through the laser resonator is determined by a cavity length L. When the laser resonator is of a Fabry-Pérot type, the repetition time interval of laser pulses corresponds to a time for which light reciprocates in the laser resonator. For this reason, a repetition frequency f of laser pulses is represented by equation (2):

$$f = c/2L \qquad (2)$$

To increase the repetition frequency of laser pulses, it is effective to reduce the cavity length L. When the cavity length L is decreased, the apparatus itself can be made compact.

The conventional ultrashort pulse laser apparatus meets the demand for short pulses almost to the theoretical limitation. However, the demand for a higher repetition frequency of optical pulses and the demand for size reduction of the apparatus itself are not necessarily satisfied yet.

It is an object of the present invention to provide an ultrashort pulse laser apparatus capable of increasing the repetition frequency of laser pulses and also achieving size reduction of the apparatus.

In order to achieve the above object, according to the present invention, there is provided an ultrashort pulse laser apparatus comprising (1) a laser medium, (2) a laser resonator which stores the laser medium and externally extracts a laser beam, and (3) an excitation source for outputting an excitation energy to the laser resonator to excite the laser medium, the laser resonator comprising (i) a plurality of resonant mirrors disposed on both sides of the laser medium to form a resonant optical path, and (ii) a phase dispersion compensation unit which includes two optical members respectively arranged on two light input/output surface sides of the laser medium on the resonant optical path and compensates phase dispersion of light in the resonant optical path.

In the ultrashort pulse laser apparatus of the present invention, the laser medium is arranged between the two optical members, e.g., a prism pair of the phase dispersion compensation unit. With this arrangement, even when the laser medium is arranged almost at the center of the laser resonator to stabilize mode locking, a cavity length L of the resonant optical path can be reduced.

More specifically, to effectively perform phase compensation of the light in the resonant optical path by the phase dispersion compensation unit constituted by the two optical members such as a prism pair, an optical distance L' between these two optical members must be ensured. In the conventional ultrashort pulse laser apparatus, relation (3) must be satisfied on the basis of the demand for arranging the laser medium almost at the center of the laser resonator:

$$L \geq 2L' \qquad (3)$$

In the ultrashort pulse laser apparatus of the present invention, however, the laser medium is disposed in the optical path between the two optical members of the phase dispersion compensation unit. Therefore, only relation (4) need be satisfied in principle:

$$L \geq L' \qquad (4)$$

With this arrangement, the cavity length of the resonant optical path can be reduced to almost ½ the conventional length while maintaining the performance of the conventional ultrashort pulse laser apparatus. As a result, the repetition frequency of laser pulses can be increased on the basis of the above-mentioned equation (2), and at the same time, size reduction of the laser apparatus itself can be achieved.

In the ultrashort pulse laser apparatus of the present invention, preferably, the plurality of resonant mirrors include an output coupling mirror for externally extracting the laser beam from the laser resonator and a high-reflectance mirror having a reflectance higher than that of the output coupling mirror with respect to the light in the resonant optical path. In this case, one of the plurality of resonant mirrors serves as a light extraction unit for externally extracting the laser beam from the laser resonator.

In the ultrashort pulse laser apparatus of the present invention, preferably, the phase dispersion compensation unit includes, as the two optical members, a pair of prisms or a pair of diffraction gratings arranged to separate the light in the resonant optical path into a plurality of parallelly traveling wavelength components. In this case, the phase dispersion compensation unit can match the phases in units of wavelengths of the light in the resonant optical path by adjusting the distance between the pair of prisms or the pair of diffraction gratings.

In the ultrashort pulse laser apparatus of the present invention, preferably, the laser resonator further comprises a mirror moving unit for moving at least one of the plurality of resonant mirrors along the resonant optical path to change a cavity length of the resonant optical path. In this case, the mirror moving unit is constituted by, e.g., a conveyor attached to the movable resonant mirror and changes the cavity length of the resonant optical path in correspondence with the position of the resonant mirror. Therefore, the repetition period of laser pulses can be variably set on the basis of the above equation (2).

In the ultrashort pulse laser apparatus of the present invention, preferably, the laser resonator further comprises a wavelength selection mechanism for extracting, as the laser beam, a predetermined wavelength component from the light of the resonant optical path. In this case, since the wavelength selection mechanism arbitrarily selects only the desired wavelength component of a plurality of wavelength components having different optical paths set by the phase dispersion compensation unit, the generation wavelength of laser pulses can be variably set.

The wavelength selection mechanism preferably includes a mirror rotation unit for changing an angle of a reflecting surface of at least one of the plurality of resonant mirrors with respect to the resonant optical path. In this case, since the mirror rotation unit returns only the desired wavelength component of the plurality of wavelength components having different optical paths set by the phase dispersion compensation unit onto the resonant optical path, the generation wavelength of laser pulses can be variably set.

The wavelength selection mechanism preferably includes a slit arranged on the resonant optical path, and a slit moving unit for moving the slit along a direction perpendicular to the resonant optical path. In this case, since the slit moving unit causes the slit to transmit only the desired wavelength component of the plurality of wavelength components having different optical paths set by the phase dispersion compensation unit, the generation wavelength of laser pulses can be variably set.

In the ultrashort pulse laser apparatus of the present invention, preferably, the laser medium has a nonlinear optical effect and generates short pulses from the light in the resonant optical path on the basis of self-mode locking. In this case, the laser medium serves as a pulse generation unit for generating short pulses from the light in the resonant optical path.

Preferably, the laser medium is a solid medium which has a Kerr lens effect as the nonlinear optical effect and generates the short pulses from the light in the resonant optical path on the basis of Kerr lens mode locking as self-mode locking. In this case, the laser medium is a solid medium such as a Cr:LiSAF ($Cr^{3+}$:$LiSrAlF_6$) crystal.

In the ultrashort pulse laser apparatus of the present invention, preferably, the laser resonator further comprises a pulse generation unit for generating short pulses from the light in the resonant optical path. In this case, the pulse generation unit may generate the short pulses from the light in the resonant optical path independently of self-mode locking of the laser medium itself, or may generate the short pulses from the light in the resonant optical path on the basis of self-mode locking of the laser medium itself.

The pulse generation unit is preferably disposed in an optical path between the two optical members of the phase dispersion compensation unit. In this case, the pulse generation unit does not occupy an independent place on a resonant optical path different from the optical path between the two optical members of the phase dispersion compensation unit. Therefore, the size of the laser apparatus can be further reduced.

The pulse generation unit preferably includes a saturable absorber having a nonlinear optical effect, which is arranged on the resonant optical path to generate the short pulses from the light in the resonant optical path on the basis of passive mode locking. In this case, the saturable absorber is, e.g., DQOCI (1,3'-Diethyl-4,2'-quinolyoxacarbocyanine Iodiode) or DODCI (3,3'-Diethyl-oxadicarbocyanine Iodiode), and the laser medium is, e.g., a dye medium such as Rhodamine 6G.

The pulse generation unit preferably includes a mirror vibration unit for vibrating a reflecting surface of at least one of the plurality of resonant mirrors with respect to the optical path and generating the short pulses from the light in the resonant optical path on the basis of active mode locking. In this case, the mirror vibration unit is, e.g., a loudspeaker attached to the resonant mirror.

More preferably, the pulse generation unit further includes a monitor unit which monitors a mode locking of the laser to designate the mirror vibration unit to stop vibration of the reflecting surface when mode locking of the laser is started, and designate the mirror vibration unit to start vibration of the reflecting surface when mode locking of the laser is canceled.

In this case, the monitor unit monitors the mode locking state of the laser after vibration of the resonant mirror is started by the mirror vibration unit, thereby stopping vibration of the resonant mirror when mode locking of the laser is started and restarting vibration of the resonant mirror when mode locking of the laser is canceled. Therefore, the mode-locked state of the light is kept stable.

The pulse generation unit preferably includes an optical modulator integrated with the laser medium to modulate the light in the resonant optical path and generate the short pulses from the light in the resonant optical path on the basis of active mode locking, and a variable modulation signal generator for variably adjusting a modulation signal to be supplied to the optical modulator to select a mode of the light in the resonant optical path. In this case, the optical modulator is integrated with the laser medium and does not occupy an independent place on the resonant optical path as the pulse generation unit. Therefore, the size of the laser apparatus can be further reduced.

More preferably, the pulse generation unit further includes a monitor unit which monitors a mode locking state of the laser to designate the variable modulation signal generator to stop optical modulation when mode locking of the laser is started, and designate the variable modulation signal generator to start optical modulation when mode locking of the laser is canceled.

In this case, the monitor unit monitors the mode locking state of the laser after optical modulation is started by the optical modulator, thereby stopping optical modulation when mode locking of the laser is started and restarting optical modulation when mode locking of the laser is canceled. Therefore, the mode-locked state of the light is kept stable.

In the ultrashort pulse laser apparatus of the present invention, preferably, the laser medium is a solid medium, and the excitation source is a semiconductor laser. In this case, since the laser apparatus is entirely constituted by solid materials, the apparatus itself can be easily handled.

The semiconductor laser preferably has an MOPA (Master Oscillator Power Amplifier) structure. In this case, the MOPA type semiconductor laser can condense excitation light into a smaller spot in the solid laser medium unlike a general semiconductor laser having a large astigmatic difference. Therefore, mode locking of the laser can be kept stable.

In the ultrashort pulse laser apparatus of the present invention, preferably, the laser resonator further comprises a temperature adjustment mechanism for holding a temperature of the laser medium substantially at a predetermined value. In this case, laser oscillation is performed while the temperature adjustment mechanism holds the temperature of the laser medium at an operation temperature suitable for the laser medium (generally at a low temperature). Therefore, the intensity of laser pulses can be kept stable.

The temperature adjustment mechanism preferably includes a cooling unit disposed in contact with the laser medium to absorb heat of the laser medium, and a heat dissipation member disposed in contact with the cooling unit to dissipate the heat from the cooling unit outside the laser resonator. In this case, the cooling unit is constituted by, e.g., a Peltier device.

In the ultrashort pulse laser apparatus of the present invention, preferably, the laser resonator has, as the plurality of resonant mirrors, two resonant mirrors arranged to form the resonant optical path as a Fabry-Pérot type optical path. In this case, to keep mode locking of the laser stable, the position of the laser medium must be set almost at the center of the laser resonator.

In the ultrashort pulse laser apparatus of the present invention, preferably, the laser resonator comprises, as the plurality of resonant mirrors, at least three resonant mirrors arranged to form the resonant optical path as a ring-shaped optical path. In this case, to suitably generate laser pulses, the position of the laser medium can be arbitrarily set in the resonant optical path.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 8 is an optical path diagram showing the arrangement of an ultrashort pulse laser apparatus according to the seventh embodiment of the present invention;

DESCRIPTION OF THE PREFERRED EMBODIMENTS

Figure 1:
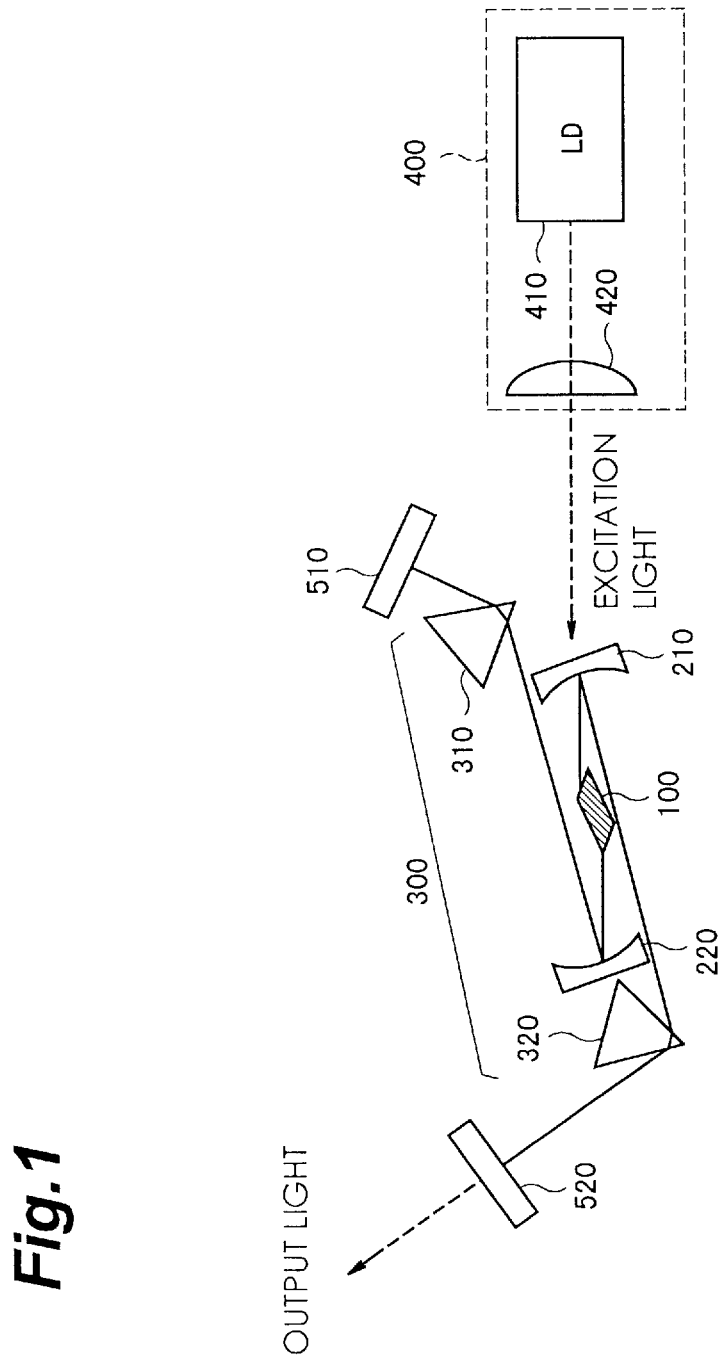
FIG. 1 is an optical path diagram showing the arrangement of an ultrashort pulse laser apparatus according to the first embodiment of the present invention.

The arrangements and functions of the embodiments of an ultrashort pulse laser apparatus according to the present invention will be described below in detail with reference to FIGS. 1 to 19. The same reference numerals denote the same elements throughout the drawings, and a detailed description thereof will be omitted. The dimensional ratios of the drawings do not always agree with those in the description.

First Embodiment

FIG. 1 is a diagram showing an ultrashort pulse laser apparatus according to the present embodiment. As shown in FIG. 1, this apparatus comprises (a) a laser medium 100 consisting of a Cr:LiSAF ($Cr^{3+:LiSrAlF}{}_{6}$) crystal as a solid medium, and (b) a condenser optical system constituted by a concave mirror 210 arranged on one light input/output surface side of the laser medium 100 and a concave mirror 220 arranged on the other light input/output surface side of the laser medium 100 and separated from the concave mirror 210 by about 10 cm on the resonant optical path.

This apparatus also comprises (c) a phase dispersion compensation unit 300 constituted by two prisms 310 and 320 which consist of BK7 and are separated from each other by a distance of 46 cm on the optical path, in which the laser medium 100, the concave mirror 210, and the concave mirror 220 are arranged at the central portion of the optical path between the prisms 310 and 320, (d) a resonant mirror 510 which serves as an HR (High Reflector) having a high refractive index with respect to light in the resonant optical path and forms one end face of the laser resonator, and an output mirror 520 which is separated from the resonant mirror 510 by 69 cm on the resonant optical path and forms the other end face of the laser resonator to serve as an OC (Output Coupler) for externally extracting the light in the resonant optical path from the laser resonator, and (e) an excitation source 400 for supplying an excitation energy to the laser medium 100.

The phase dispersion compensation unit 300 is arranged at the central portion of the Fabry-Pérot type resonant optical path between the two resonant mirrors 510 and 520. Since the laser medium 100 is arranged at the central portion of the optical path between the two prisms 310 and 320, the laser medium 100 is arranged almost at the center of the Fabry-Pérot type resonant optical path of the laser resonator.

Figure 2:
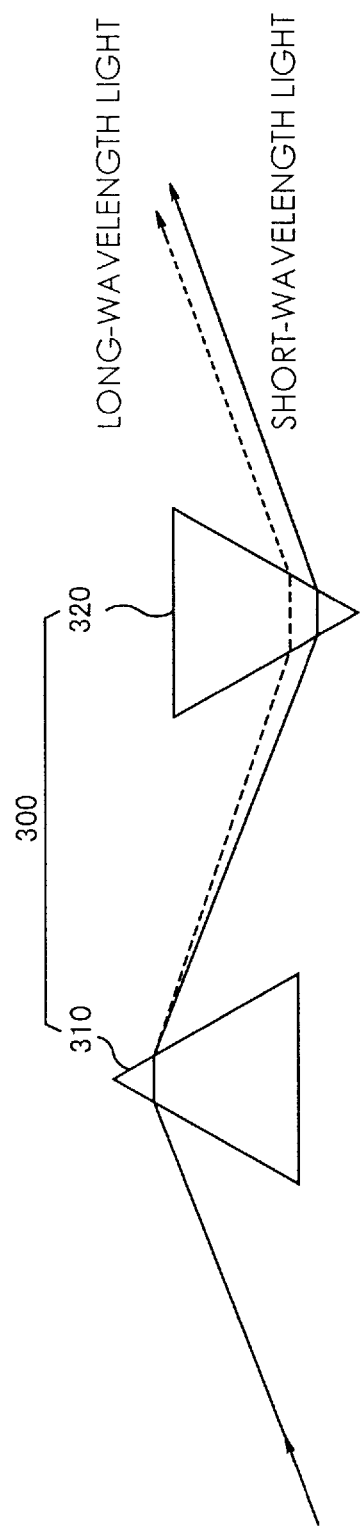
FIG. 2 is an optical path diagram showing the function of the phase dispersion compensation unit of the ultrashort pulse laser apparatus shown in FIG. 1.

FIG. 2 is an explanatory view of the operation of the phase dispersion compensation unit 300. As shown in FIG. 2, as the wavelength becomes short, the refractive index of the two prisms 310 and 320 becomes high. Therefore, short-wavelength light travels through an optical path indicated by the solid line, and long-wavelength light travels through an optical path indicated by the broken line. Light incident on the prism 310 (or the prism 320) along the same optical path is output from the prism 320 (or the prism 310) through the two prisms 310 and 320, though the light components are separated in units of parallelly traveling wavelengths.

The travelling optical path distance through the two prisms 310 and 320 changes depending on the wavelength. When the distance between the two prisms 310 and 320 is adjusted, the phase dispersion in the laser resonator is compensated such that the total dispersion amount becomes almost zero, thereby matching the phases in units of wavelengths. As the two prisms 310 and 320, general regular triangular prisms can be used.

To reduce the optical loss, the light is preferably incident at a Brewster angle $\theta = \tan^{-1} n$ using the refractive index n of the two prisms 310 and 320. In this case, a vertical angle $\alpha$ of each of the prisms 310 and 320 can be obtained by equation (5):

$$\alpha = 2 \sin^{-1}[(\sin (\tan^{-1} n))/n] \quad (5)$$

For the two prisms 310 and 320 consisting of BK7, the vertical angle $\alpha$ is about 67°. Light passes near the vertex of the vertical angle $\alpha$ of the two prisms 310 and 320. Therefore, only a portion near the vertex of the vertical angle $\alpha$ need have a prism shape.

Similar phase dispersion compensation is also enabled using a diffraction grating pair, though the diffraction grating pair must be used in consideration of the light utilization efficiency because the optical loss is relatively large. When the difficulty in design is overcome, and the uncontrollability of the compensation amount after the manufacture is taken into consideration, phase dispersion compensation is enabled according to the manner of dielectric multilayer coating of the resonant mirror 510 or the output mirror 520. The phase compensation means for compensating secondary phase dispersion has been described above. Other optical devices may be combined to compensate phase dispersion of higher degree.

The secondary phase dispersion amount generated in the phase dispersion compensation unit 300 is calculated as 545 $fsec^2$. The phase dispersion amount of other portions of laser resonators is considered to be around −545 $fsec^2$. Of the phase dispersion amount generated in the phase dispersion compensation unit 300, i.e., 545 $fsec^2$, secondary phase dispersion given between the two prisms is 935 $fsec^2$, and secondary phase dispersion given when light propagates about 10 cm between the two prisms 310 and 320 is −390 $fsec^2$.

To obtain the secondary phase dispersion amount of 545 $fsec^2$, the distance between the prisms must be about 53 cm for prisms consisting of synthetic silica, about 27 cm for prisms consisting of SF10, and about 26 cm for prisms consisting of LaFN28. These values are obtained by calculating the vertical angle $\alpha$ of each of the two prisms on the basis of the above-described equation (5), assuming that the light is incident at the Brewster angle.

The excitation source 400 comprises (i) an LD (Laser Diode) 410 for generating excitation light, and (ii) a condenser optical system 420 for condensing the excitation light to the laser medium 100. The Cr:LiSAF crystal of the laser medium 100 has a Kerr lens effect as a nonlinear optical effect so that short pulses are generated from the light in the resonant optical path on the basis of Kerr lens mode locking as self-mode locking. That is, the laser medium also has the function of a pulse generation unit.

In this apparatus, the excitation source 400 supplies an excitation energy to the laser medium 100. In this state, spontaneous emission occurs in the laser medium 100. The light propagates through the optical path in the laser resonator to cause stimulated emission while the phase dispersion caused depending on the wavelength is compensated by the phase dispersion compensation unit 300. Mode locking is started by the Kerr lens effect of the laser medium 100. With this operation, ultrashort pulses can be obtained at a repetition frequency f of 218 MHz by laser oscillation based on mode locking.

In FIG. 1, when the optical path distance between the prism 310 and the resonant mirror 510 is set to be 5 cm, the optical path distance between the prism 320 and the output mirror 520 is set to be 5 cm, and the cavity length L is set to be 56 cm, ultrashort pulses can be obtained at a repetition frequency f of 268 MHz.

Second Embodiment

Figure 3:
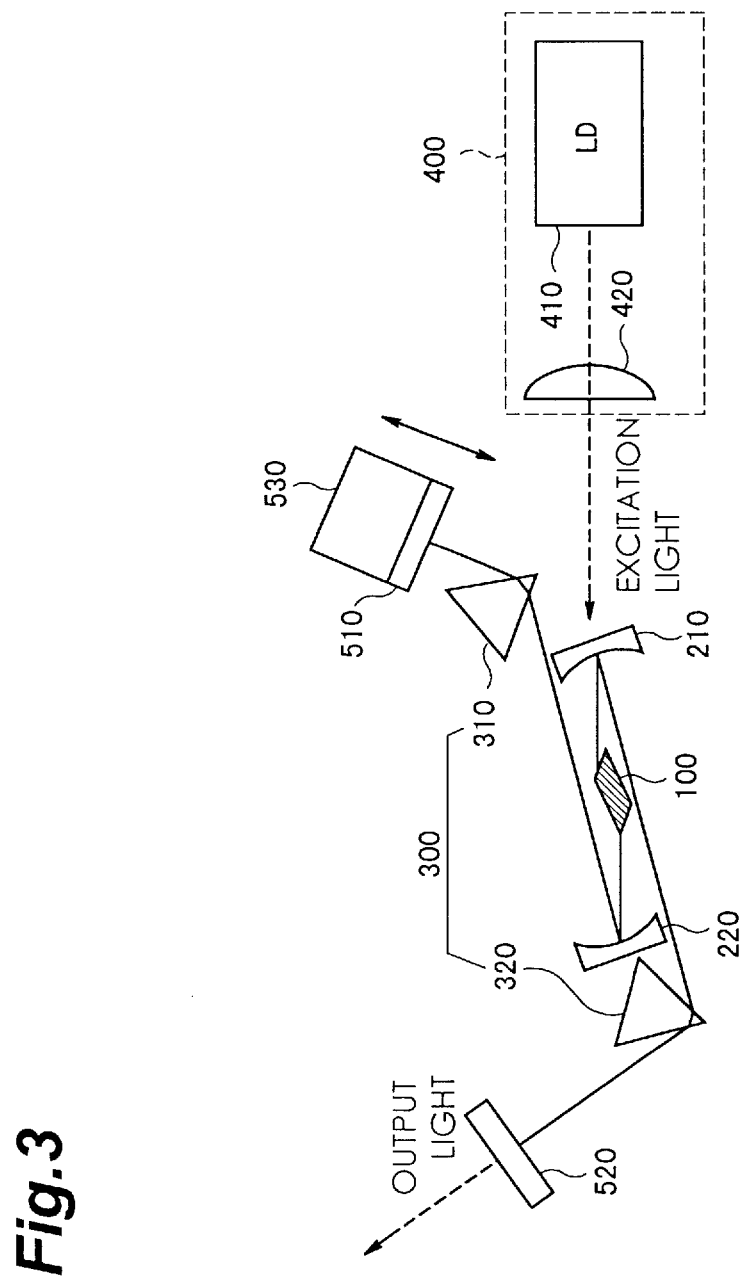
FIG. 3 is an optical path diagram showing the arrangement of an ultrashort pulse laser apparatus according to the second embodiment of the present invention.

FIG. 3 is a diagram showing an ultrashort pulse laser apparatus according to the present embodiment. As shown in FIG. 3, this apparatus further comprises, in addition to the arrangement of the apparatus of the first embodiment, (f) a mirror vibration unit 530 serving as a pulse generation unit for vibrating the reflecting surface of a resonant mirror 510 along the resonant optical path and generating short pulses from light in the resonant optical path on the basis of active mode locking.

As the mirror vibration unit 530, a loudspeaker can be suitably employed. In this case, a vibration having a frequency of several Hz to 200 Hz and an amplitude of 1 mm or less can be applied to the resonant mirror 510.

In this apparatus, an excitation source 400 supplies an excitation energy to a laser medium 100. On the other hand, the mirror vibration unit 530 applies a vibration to the resonant mirror 510. In this state, spontaneous emission occurs in the laser medium 100. The light propagates through the optical path in the laser resonator to cause stimulated emission while phase dispersion caused depending on the wavelength is compensated by a phase dispersion compensation unit 300.

Mode locking is started by the Kerr lens effect of the laser medium 100 and the vibration of the resonant mirror 510. Mode locking can be more easily and properly established than the apparatus shown in FIG. 1 because of addition of the vibration of the resonant mirror 510.

In this manner, ultrashort pulses can be obtained at a repetition frequency f of 218 MHz by laser oscillation based on mode locking. When mode locking is started, vibration of the resonant mirror 510 is stopped. In this apparatus as well, ultrashort pulses can be suitably obtained, as in the apparatus shown in FIG. 1.

Third Embodiment

Figure 4:
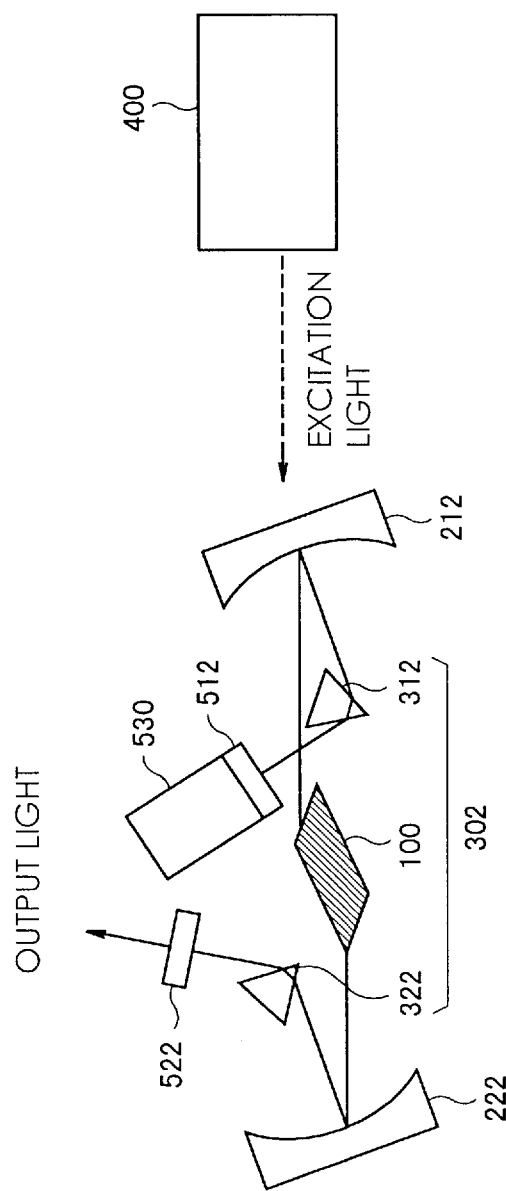
FIG. 4 is an optical path diagram showing the arrangement of an ultrashort pulse laser apparatus according to the third embodiment of the present invention.

FIG. 4 is a diagram showing an ultrashort pulse laser apparatus according to the present embodiment. In the apparatus of this embodiment, the materials, sizes, and arrangement of the members used in the present embodiment are appropriately changed to further reduce a cavity length L. As shown in FIG. 4, this apparatus comprises (a) a laser medium 100 consisting of a Cr:LiSAF crystal, and (b) a condenser optical system constituted by a concave mirror 212 arranged on one light input/output surface side of the laser medium 100 and a concave mirror 222 arranged on the other light input/output surface side of the laser medium 100 and separated from the concave mirror 212 by about 15 cm on the resonant optical path.

This apparatus also comprises (c) a phase dispersion compensation unit 302 constituted by two prisms 312 and 322 which consist of LaFN28 and are separated from each other by 28 cm on the optical path, in which the laser medium 100 is arranged at the central portion of the optical path between the two prisms 312 and 322, (d) a resonant mirror 512 which forms one end face of the laser resonator as an HR, and an output mirror 522 which is separated from the resonant mirror 512 by 30 cm on the resonant optical path and forms the other end face of the laser resonator as an OC, (e) a mirror vibration unit 530 for vibrating the reflecting surface of the resonant mirror 512 along the resonant optical path, and (f) an excitation source 400 for supplying an excitation energy to the laser medium 100.

The phase dispersion compensation unit 302 is arranged at the central portion of the resonant optical path between the resonant mirrors 512 and 522. Since the laser medium 100 is arranged at the central portion of the optical path between the prisms 312 and 322, the laser medium 100 is arranged almost at the center of the resonant optical path of the laser resonator.

In this embodiment, ultrashort pulses are generated as in the second embodiment. Since the cavity length L is set to be smaller than that of the second embodiment, i.e., about 30 cm, the repetition frequency reaches about 500 MHz which is higher than that of the second embodiment.

Fourth Embodiment

Figure 5:
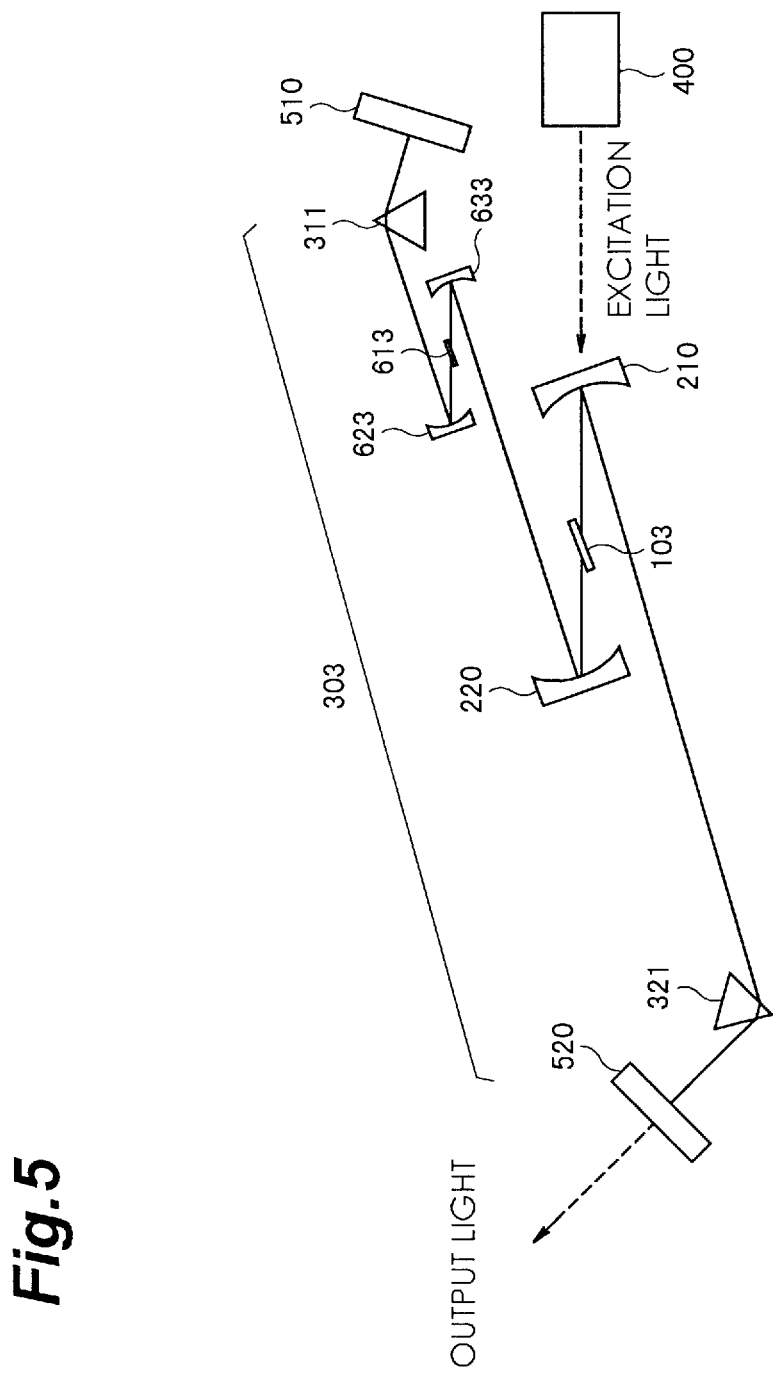
FIG. 5 is an optical path diagram showing the arrangement of an ultrashort pulse laser apparatus according to the fourth embodiment of the present invention.

FIG. 5 is a diagram showing an ultrashort pulse laser apparatus according to the present embodiment. The apparatus of this embodiment uses a dye laser medium as a laser medium, unlike the first to third embodiments. As shown in FIG. 5, this apparatus comprises (a) a laser medium 103 consisting of a dye laser medium, and (b) a condenser optical system constituted by a concave mirror 210 arranged on one light input/output surface side of the laser medium 103 and a concave mirror 220 arranged on the other light input/output surface side of the laser medium 103.

This apparatus also comprises (c) a phase dispersion compensation unit 303 constituted by two prisms 311 and 321 which consist of BK7, in which the laser medium 103 is arranged at the central portion of the optical path between the two prisms 311 and 321, (d) a saturable absorber 613 arranged in the optical path between the two prisms 311 and 321, which is different from the optical path between the two concave mirrors 210 and 220, and (e) a condenser optical system constituted by a concave mirror 623 arranged on one light input/output surface side of the saturable absorber 613, and a concave mirror 633 arranged on the other light input/output surface side of the saturable absorber 613.

This apparatus further comprises (f) a resonant mirror 510 which forms one end face of the laser resonator as an HR, and an output mirror 520 which forms the other end face of the laser resonator as an OC, and (g) an excitation source 400 for supplying an excitation energy to the laser medium 103.

The phase dispersion compensation unit 303 is arranged at the central portion of the optical path between the two resonant mirrors 510 and 520. Since the laser medium 103 is arranged at the central portion of the optical path between the prisms 311 and 321, the laser medium 103 is arranged almost at the center of the Fabry-Pérot type resonant optical path of the laser resonator.

The laser medium 103 is Rhodamine 6G as a dye medium. The saturable absorber 613 is DQOCI or DODCI as a dye medium and serves as a pulse generation unit having a nonlinear optical effect for generating short pulses from light in the resonant optical path on the basis of passive mode locking. The saturable absorber 613 is arranged in the optical path between the prism pair of the phase dispersion compensation unit 303.

In this apparatus, the excitation source 400 supplies an excitation energy to the laser medium 103. In this state, spontaneous emission occurs in the laser medium 103. The light propagates through the optical path in the laser resonator to cause stimulated emission while phase dispersion caused depending on the wavelength is compensated by the phase dispersion compensation unit 303. Mode locking is started by the function of the saturable absorber 613. Ultrashort pulses can be obtained by laser oscillation based on mode locking.

Fifth Embodiment

Figure 6:
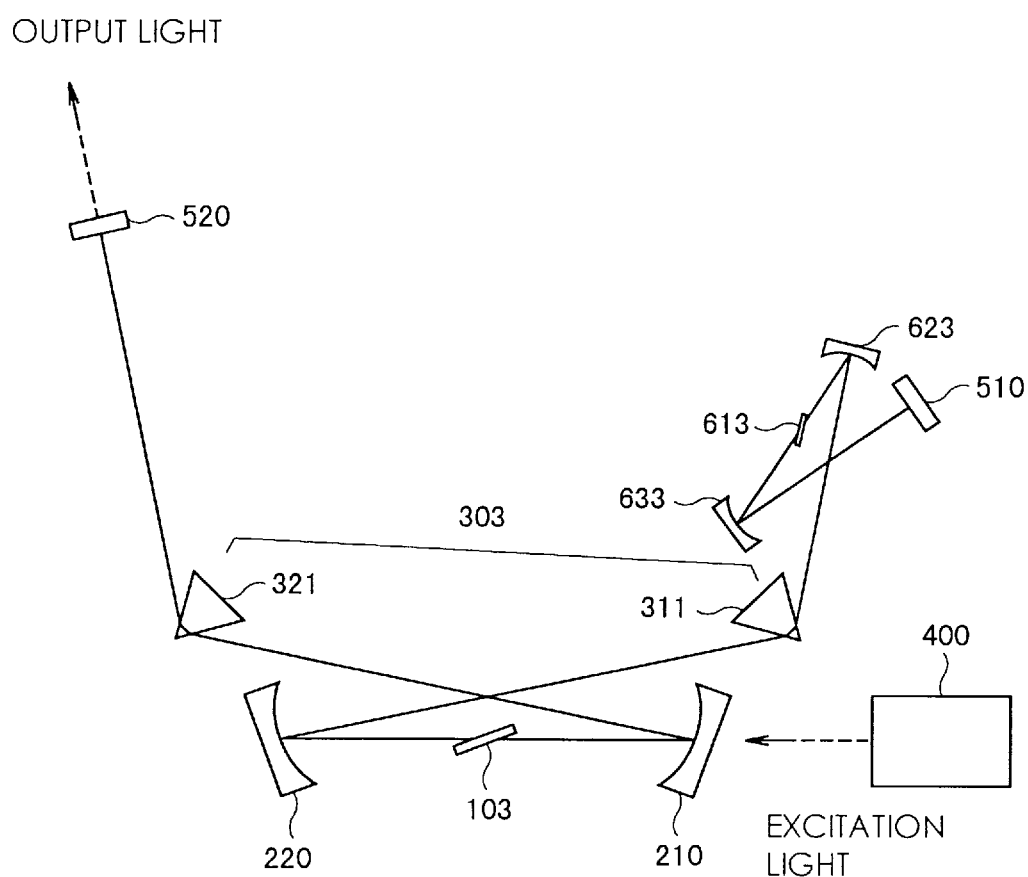
FIG. 6 is an optical path diagram showing the arrangement of an ultrashort pulse laser apparatus according to the fifth embodiment of the present invention.

FIG. 6 is a diagram showing an ultrashort pulse laser apparatus according to the present embodiment. As shown in FIG. 6, the apparatus of this embodiment is different from the fourth embodiment in that a saturable absorber 613, a concave mirror 623, and a concave mirror 633 are arranged outside of the optical path between a prism pair which constitute a phase dispersion compensation unit 303. In this apparatus, laser oscillation based on mode locking occurs, and ultrashort pulses can be obtained, as in the fourth embodiment.

Sixth Embodiment

Figure 7:
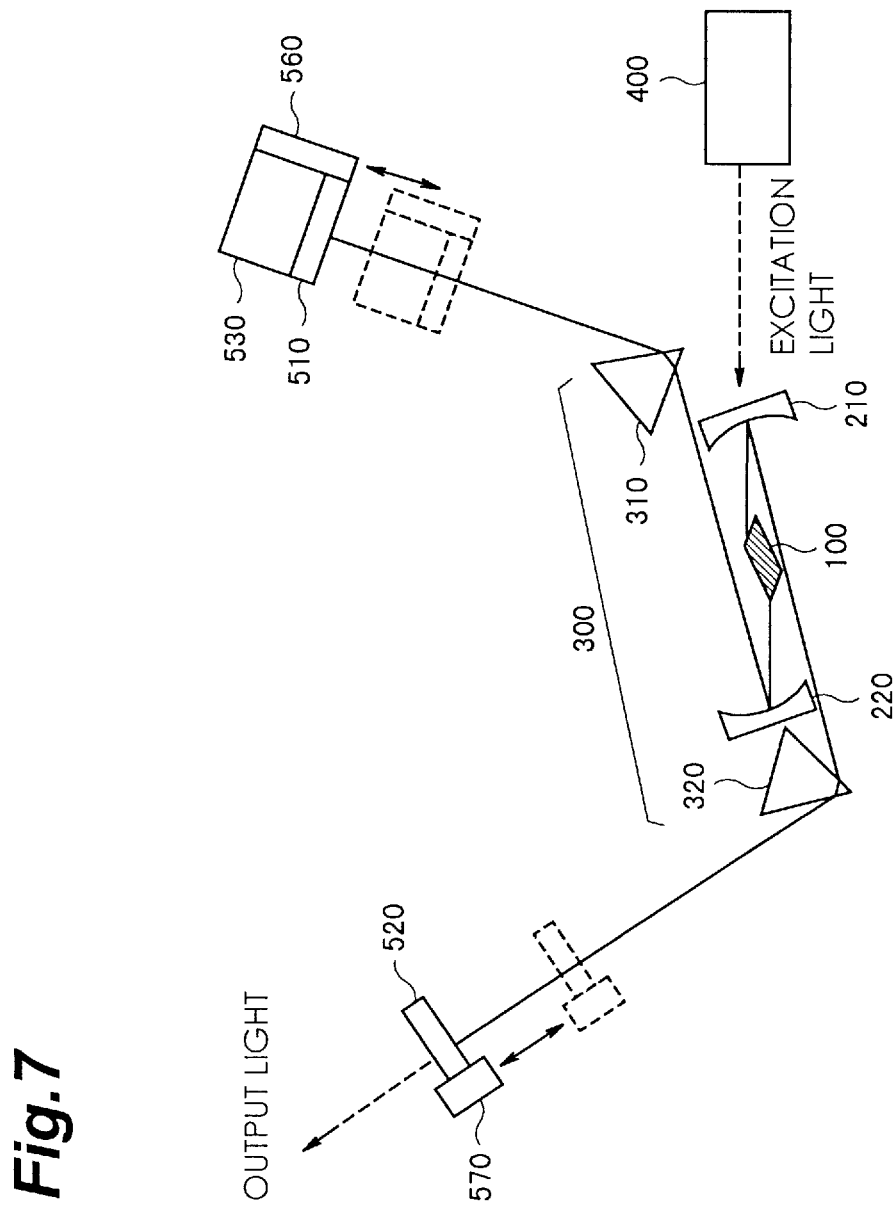
FIG. 7 is an optical path diagram showing the arrangement of an ultrashort pulse laser apparatus according to the sixth embodiment of the present invention.

FIG. 7 is a diagram showing an ultrashort pulse laser apparatus according to the present embodiment. As shown in FIG. 7, this apparatus comprises (a) a laser medium 100 consisting of a Cr:LiSAF crystal, and (b) a condenser optical system constituted by a concave mirror 210 arranged on one light input/output surface side of the laser medium 100 and a concave mirror 220 arranged on the other light input/output surface side of the laser medium 100 and separated from the concave mirror 210 by about 10 cm on the resonant optical path.

This apparatus also comprises (c) a phase dispersion compensation unit 300 constituted by two prisms 310 and 320 which consist of BK7 and are separated from each other by 46 cm on the optical path, in which the laser medium 100, the concave mirror 210, and the concave mirror 220 are arranged at the central portion of the optical path between the two prisms 310 and 320, (d) a resonant mirror 510 which forms one end face of the laser resonator as an HR, and an output mirror 520 which forms the other end face of the laser resonator as an OC, and (e) a mirror vibration unit 530 for vibrating the reflecting surface of the resonant mirror 510 along the resonant optical path.

This apparatus further comprises (f) an excitation source 400 for supplying an excitation energy to the laser medium 100, (g) a conveyor 560 which serves as a mirror moving unit for moving the position of the resonant mirror 510 on the optical axis of the laser resonator to change the cavity length of the resonant optical path, and (h) a conveyor 570 which serves as a mirror moving unit for moving the position of the output mirror 520 on the optical path to change the cavity length of the resonant optical path.

This apparatus is different from the second embodiment in that the apparatus further comprises the two conveyors 560 and 570. The phase dispersion compensation unit 300 is arranged at the central portion of the optical path between the two resonant mirrors 510 and 520. Since the laser medium 100 is arranged at the central portion of the optical path between the two prisms 310 and 320, the laser medium 100 is arranged almost at the center of the Fabry-Pérot type resonant optical path of the laser resonator.

In the apparatus of this embodiment, the position of the resonant mirror 510 is set by the conveyor 560 and at the same time, the position of the output mirror 520 is set by the conveyor 570 while maintaining the laser medium 100 at the central portion of the resonant optical path. With this operation, the resonator structure, i.e., a cavity length L is set.

Subsequently, with an operation similar to the second embodiment, ultrashort pulses are generated at a repetition frequency corresponding to the cavity length L. In the apparatus of this embodiment, the repetition frequency can be selected from the range of about 100 MHz to about 300 MHz.

In this embodiment, both the resonant mirror 510 and the output mirror 520 are moved while maintaining the laser medium 100 at the central portion of the resonant optical path. As long as the distance from the laser medium 100 to the output mirror 520 is about ⅓ to 3 times the distance from the laser medium 100 to the resonant mirror 520, only one of the resonant mirror 510 and the output mirror 520 may be moved. In this case, although mode locking slightly becomes unstable, a means for solving this instability can be added.

When the apparatus of the second embodiment has the conveyors 560 and 570, the repetition frequency can be selected from the range of about 100 MHz to about 500 MHz.

Seventh Embodiment

FIG. 8 is a diagram showing an ultrashort pulse laser apparatus according to the present embodiment. As shown in FIG. 8, this apparatus is different from the second embodiment only in that this apparatus uses an MOPA type semiconductor laser 411 as a semiconductor laser.

Figure 9A:
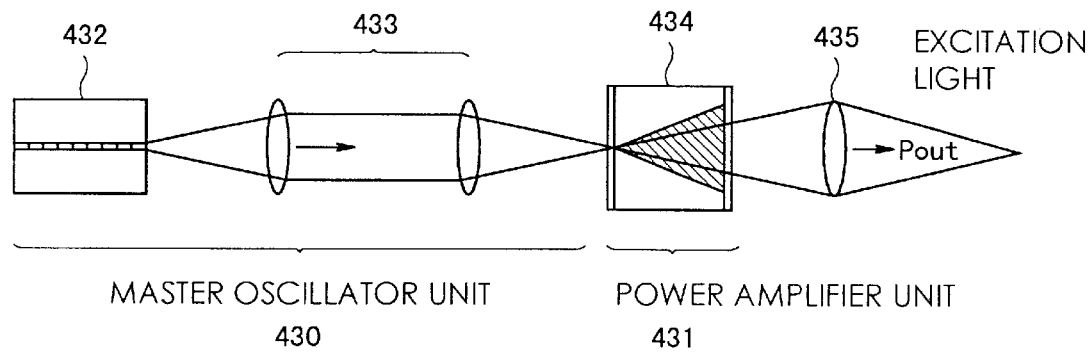
FIG. 9A is an optical path diagram showing the arrangement of a device-separated MOPA serving as the excitation source of the ultrashort pulse laser apparatus shown in FIG. 8.
Figure 9B:
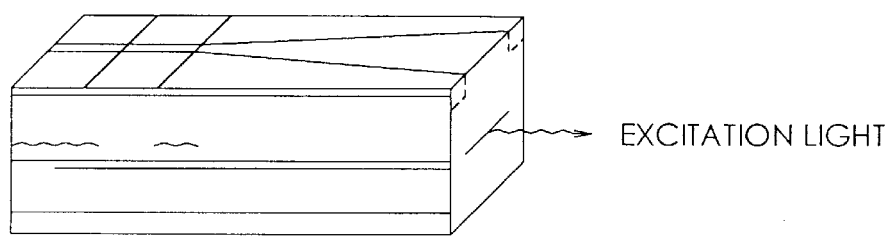
FIG. 9B is a perspective view showing the arrangement of a device-integrated MOPA serving the excitation source of the ultrashort pulse laser apparatus shown in FIG. 8.

FIGS. 9A and 9B are views showing the arrangements of MOPAs. FIG. 9A shows the arrangement of a device-separated tapered semiconductor laser amplification MOPA. FIG. 9B shows the arrangement of a device-integrated tapered semiconductor laser amplification MOPA.

As shown in FIG. 9A, the device-separated tapered LD amplification MOPA comprises a master oscillator unit 430 constituted by an oscillator 432 as a single-mode LD, and a relay optical system 433 consisting of a lens group for relaying output light from the oscillator 432, and a power amplifier unit 431 constituted by an optical amplifier 434 as a tapered LD for amplifying a light beam guided by the relay optical system 433, and a condenser optical system 435 for condensing output light from the tapered LD 434.

As shown in FIG. 9B, the device-integrated tapered LD amplification MOPA comprises a master oscillator unit 440 and a power amplifier unit 441, which are integrally formed on a substrate. The master oscillator unit 440 includes a single-mode LD having the same structure as that of the oscillator 432. The power amplifier unit 441 includes a tapered LD having the same structure as that of the optical amplifier 434. The master oscillator unit 440 may further include an optical modulator between the single-mode LD and the tapered LD.

Either MOPA is constituted by a master oscillator unit and a power amplifier unit which is optically coupled to the oscillator of the master oscillator unit. In addition to the above-described tapered semiconductor laser amplification type MOPAs, there are also diffraction grating resonator type MOPAs.

To increase the light intensity of a laser beam, the intensity density of the excitation light in a laser medium 100 must be increased. When a general high-power semiconductor laser is employed, the light can hardly be condensed because the high-power semiconductor laser has an active layer with a large sectional area. In the MOPA, however, oscillation occurs at a small sectional area portion of the active layer first, and then power amplification is performed. For this reason, a high-power laser beam which can be easily condensed can be obtained.

In the apparatus of this embodiment, the intensity density of the excitation light in the laser medium 100 can be increased, and mode locking can be stabilized. Therefore, suitable ultrashort pulses can be obtained. In addition, since both the laser medium 100 and an excitation source 400 are formed of solid materials, the entire laser apparatus has a solid-state structure, and the apparatus can be easily handled.

Eighth Embodiment

Figure 10:
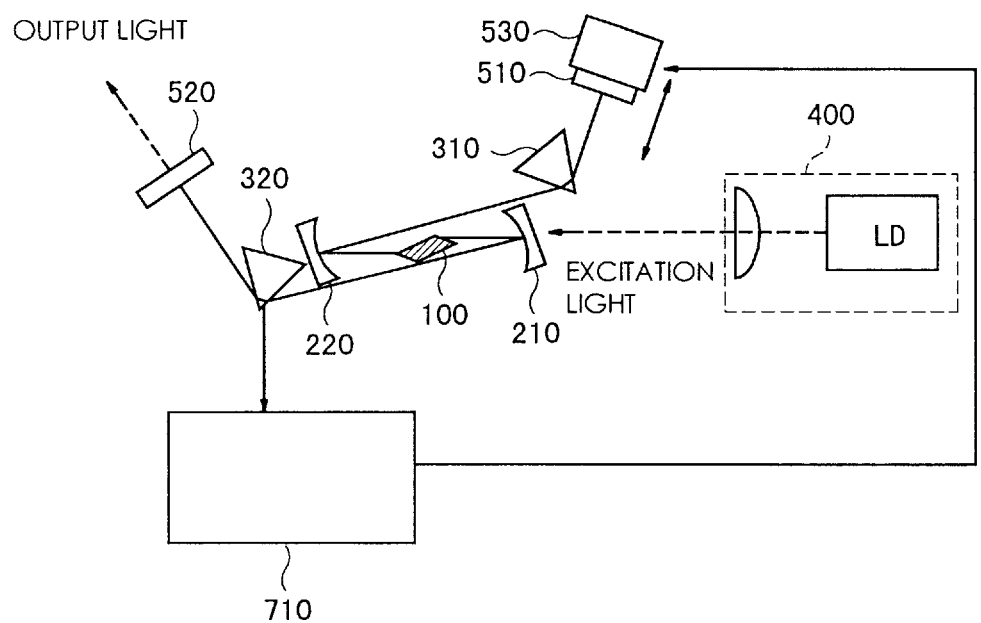
FIG. 10 is an optical path diagram showing the arrangement of an ultrashort pulse laser apparatus according to the eighth embodiment of the present invention.
Figure 11:
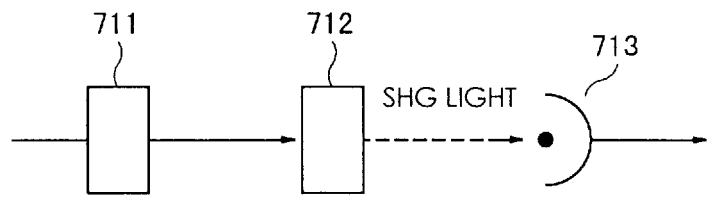
FIG. 11 is an optical path diagram showing the arrangement of the monitor unit of the ultrashort pulse laser apparatus shown in FIG. 10.

FIG. 10 is a diagram showing an ultrashort pulse laser apparatus according to the present embodiment. As shown in FIG. 10, this apparatus is different from the second embodiment in that this apparatus further comprises a monitor unit 710 which monitors the mode locking state of the laser to designate a mirror vibration unit 530 to stop vibration of the reflecting surface when mode locking of the laser is started, and designate the mirror vibration unit 530 to start vibration of the reflecting surface when mode locking of the laser is canceled FIG. 11 is a diagram showing the arrangement of the monitor unit 710. As shown in FIG. 11, the monitor unit 710 comprises (i) an electrooptic crystal 711 for receiving light reflected by the light incident surface of a prism 320 and generating SHG (Second Harmonic Generation) light, (ii) a wavelength filter 712 for transmitting only the second harmonic light, and (iii) a photodetector for receiving light through the wavelength filter 712 and detecting the light intensity. As the electrooptic crystal 711, an LIO (Lithium Iodate; $LiIO_3$) crystal or an ADP (Ammonium Dihydrogen Phosphate; $NH_4H_2PO_4$) crystal can be suitably employed.

When light in the resonant optical path is set in a mode-locked state, the intensity of the light in the laser resonator increases. Therefore, when the light reflected by the light incident surface of the prism 320 is incident on the electrooptic crystal 711, the SHG light intensity increases. This change in light intensity of the SHG light is detected by a photodetector 713, thereby monitoring the mode-locked state.

In this apparatus, ultrashort pulses are generated as in the second embodiment. By monitoring the mode locking state of the laser, when mode locking of the laser is started, vibration is stopped, and when mode locking is canceled, vibration is started to restart the mode locking state. Consequently, the mode-locked state can be kept stable, so that ultrashort pulses can be stably obtained.

Ninth Embodiment

Figure 12:
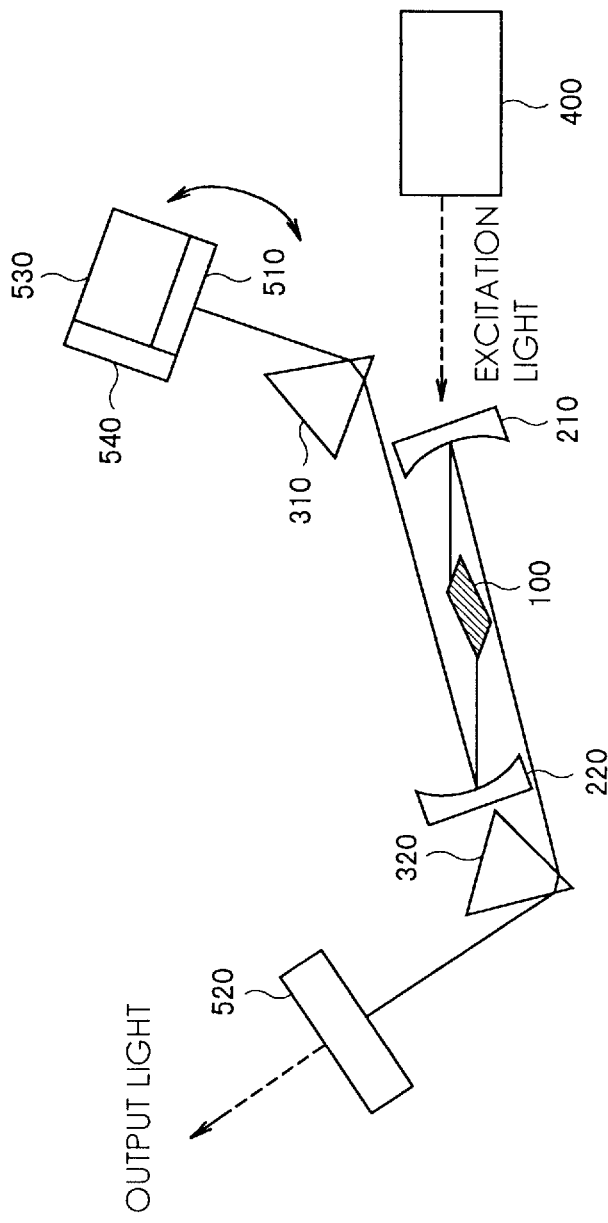
FIG. 12 is an optical path diagram showing the arrangement of an ultrashort pulse laser apparatus according to the ninth embodiment of the present invention.

FIG. 12 is a diagram showing an ultrashort pulse laser apparatus according to the present embodiment. This apparatus is different from the second embodiment in that this apparatus further comprises, as a wavelength selection mechanism, a mirror rotation unit 540 for changing the angle of the reflecting surface of a resonant mirror 510 with respect to the resonant optical path.

In this apparatus, the angle of the resonant mirror 510 is changed with respect to the resonant optical path by the mirror rotation unit 540. Consequently, of light components having various wavelengths and different optical paths set by a phase dispersion compensation unit 300 in units of wavelengths, only a light component having a desired wavelength range is returned to the resonant optical path. With this arrangement, the center wavelength of a resultant ultrashort pulse can be changed.

10th Embodiment

Figure 13:
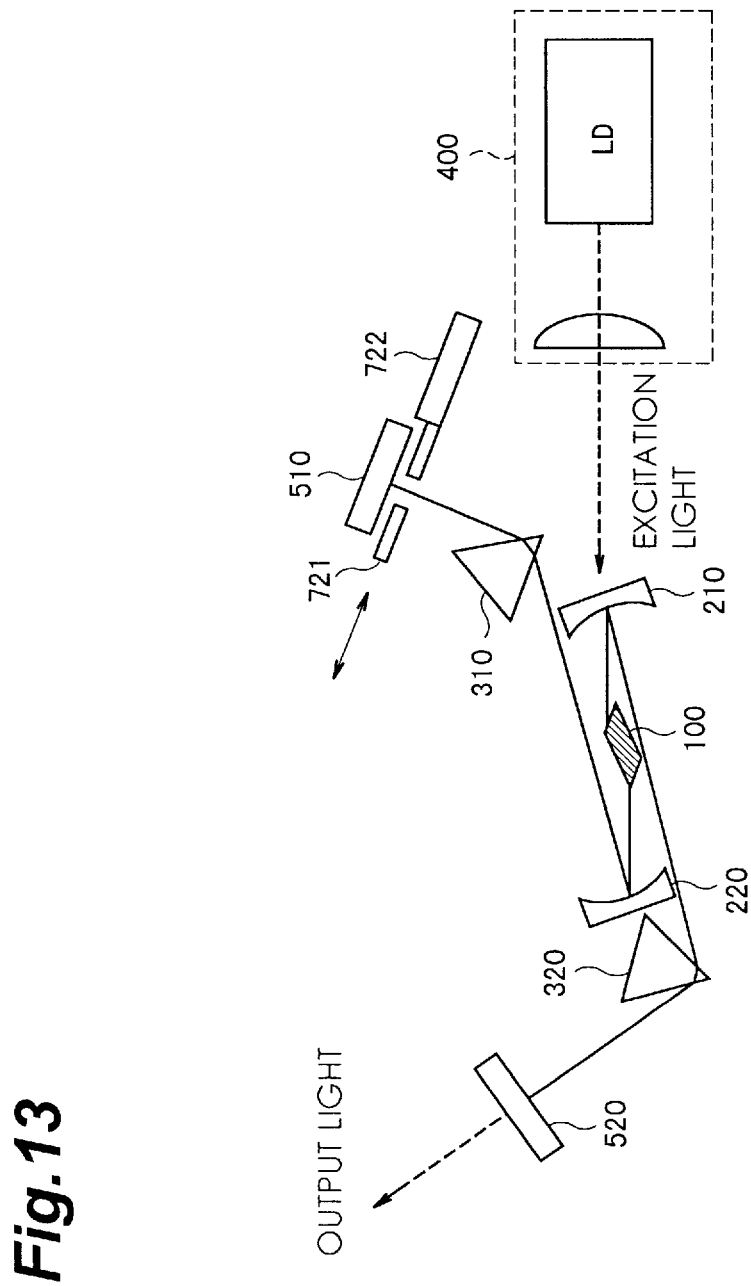
FIG. 13 is an optical path diagram showing the arrangement of an ultrashort pulse laser apparatus according to the 10th embodiment of the present invention.

FIG. 13 is a diagram showing an ultrashort pulse laser apparatus according to the present embodiment. As shown in FIG. 13, this apparatus is different from the first embodiment in that this apparatus further comprises a wavelength selection mechanism constituted by a slit 721 arranged in the resonant optical path, and a slit moving unit 722 for moving the slit 721 in a direction perpendicular to the resonant optical path.

In this apparatus, the slit 721 is moved by the slit moving unit 722 in the direction perpendicular to the optical axis of the laser resonator. Consequently, of light components having various wavelengths and different optical paths set by a phase dispersion compensation unit 300 in units of wavelengths, only a light components having a desired wavelength range is extracted as resonant light. With this arrangement, the center wavelength of a resultant ultrashort pulse can be changed.

11th Embodiment

Figure 14:
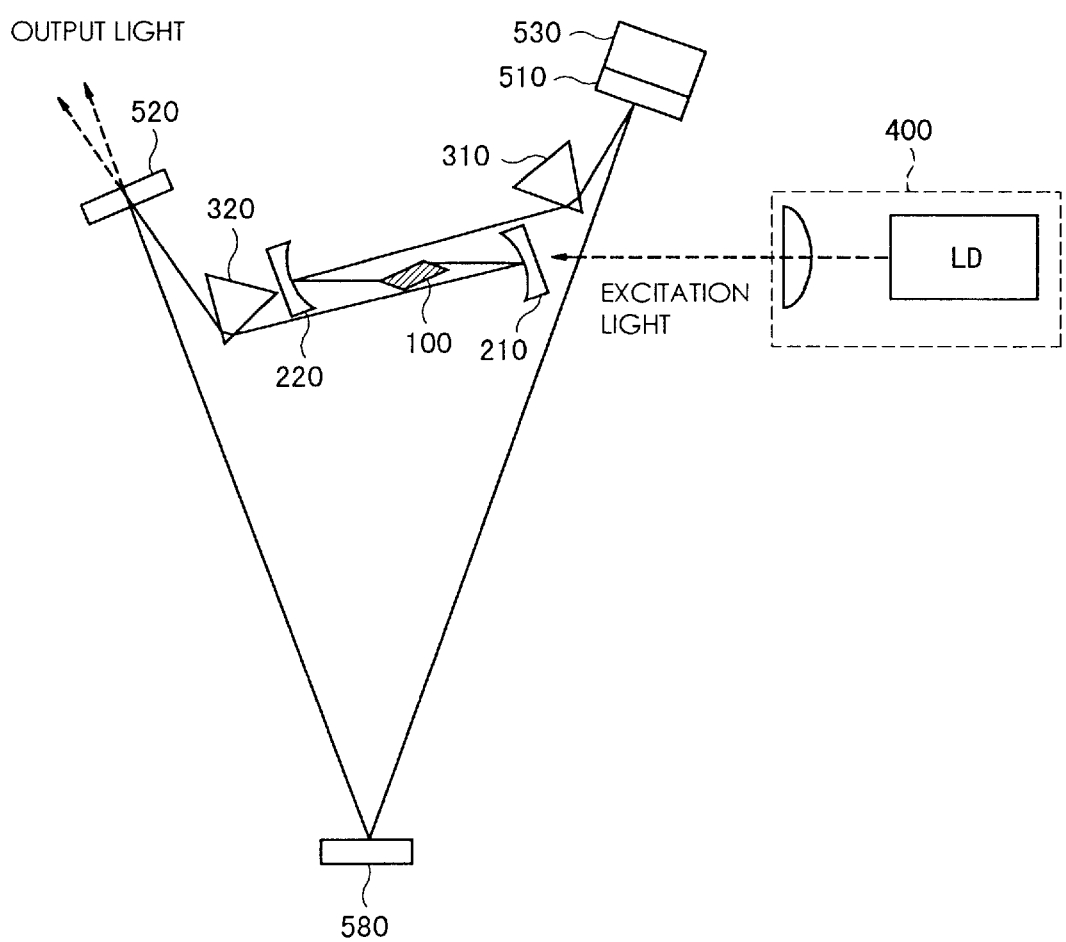
FIG. 14 is an optical path diagram showing the arrangement of an ultrashort pulse laser apparatus according to the 11th embodiment of the present invention.

FIG. 14 is a diagram showing an ultrashort pulse laser apparatus according to the present embodiment. As shown in FIG. 14, this apparatus is different from the second embodiment in that this apparatus further comprises a resonant mirror 580 and has a ring-shaped resonant optical path.

This apparatus has a ring-shaped, i.e., looped resonant optical path, so the distance between a laser medium 100 and two resonant mirrors 510 and 520 need not be taken into consideration. Therefore, the laser medium 100 can be arranged at an arbitrary position in the resonant optical path, and ultrashort pulses can be suitably generated. A repetition frequency f of laser pulses is represented by equation (6) by using a cavity length L of the resonant optical path:

$$f = c/L \tag{6}$$

12th Embodiment

Figure 15:
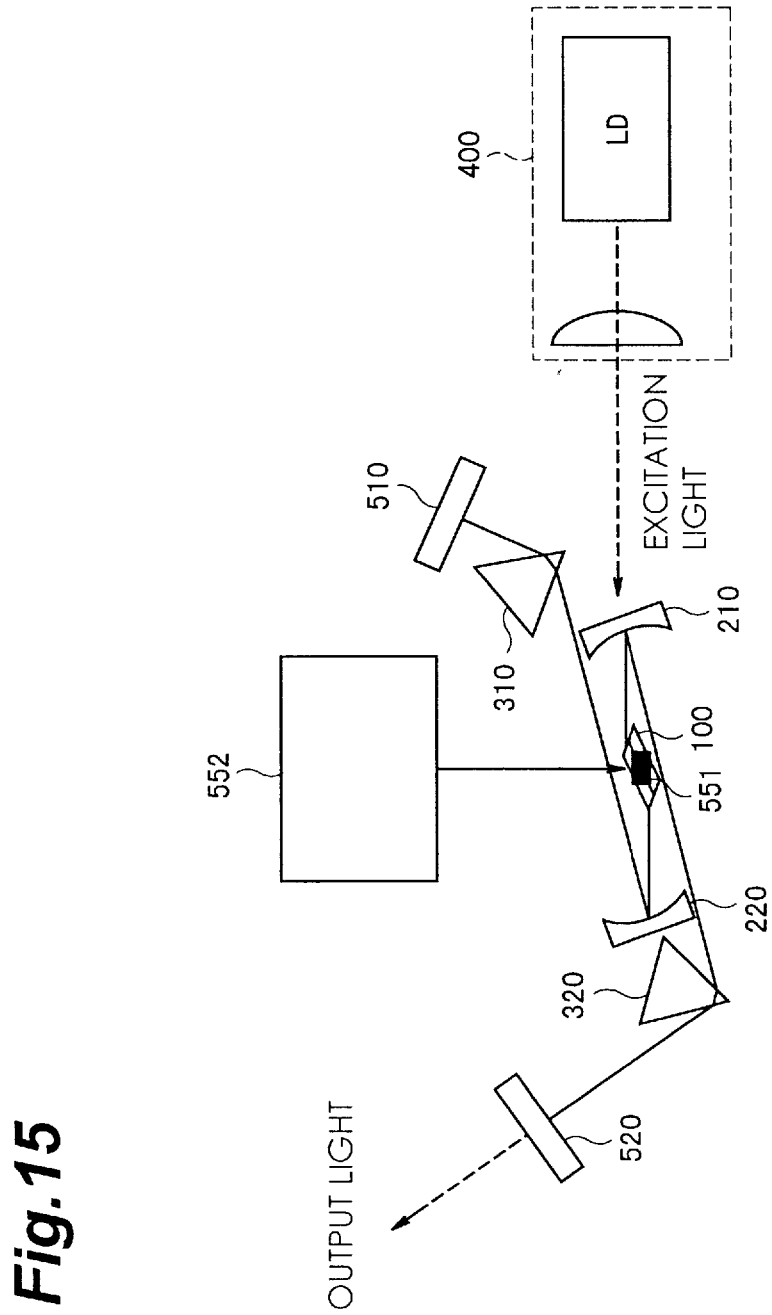
FIG. 15 is an optical path diagram showing the arrangement of an ultrashort pulse laser apparatus according to the 12th embodiment of the present invention.

FIG. 15 is a diagram showing an ultrashort pulse laser apparatus according to the present embodiment. As shown in FIG. 15, this apparatus is different from the first embodiment in that this apparatus comprises, as an optical modulator, a transducer 551 integrated with a laser medium 100 to modulate light in the resonant optical path, and a variable modulation signal generation unit 552 which variably adjusts a modulation signal to be supplied to the transducer 551 for stabilizing mode locking state.

Figure 16:
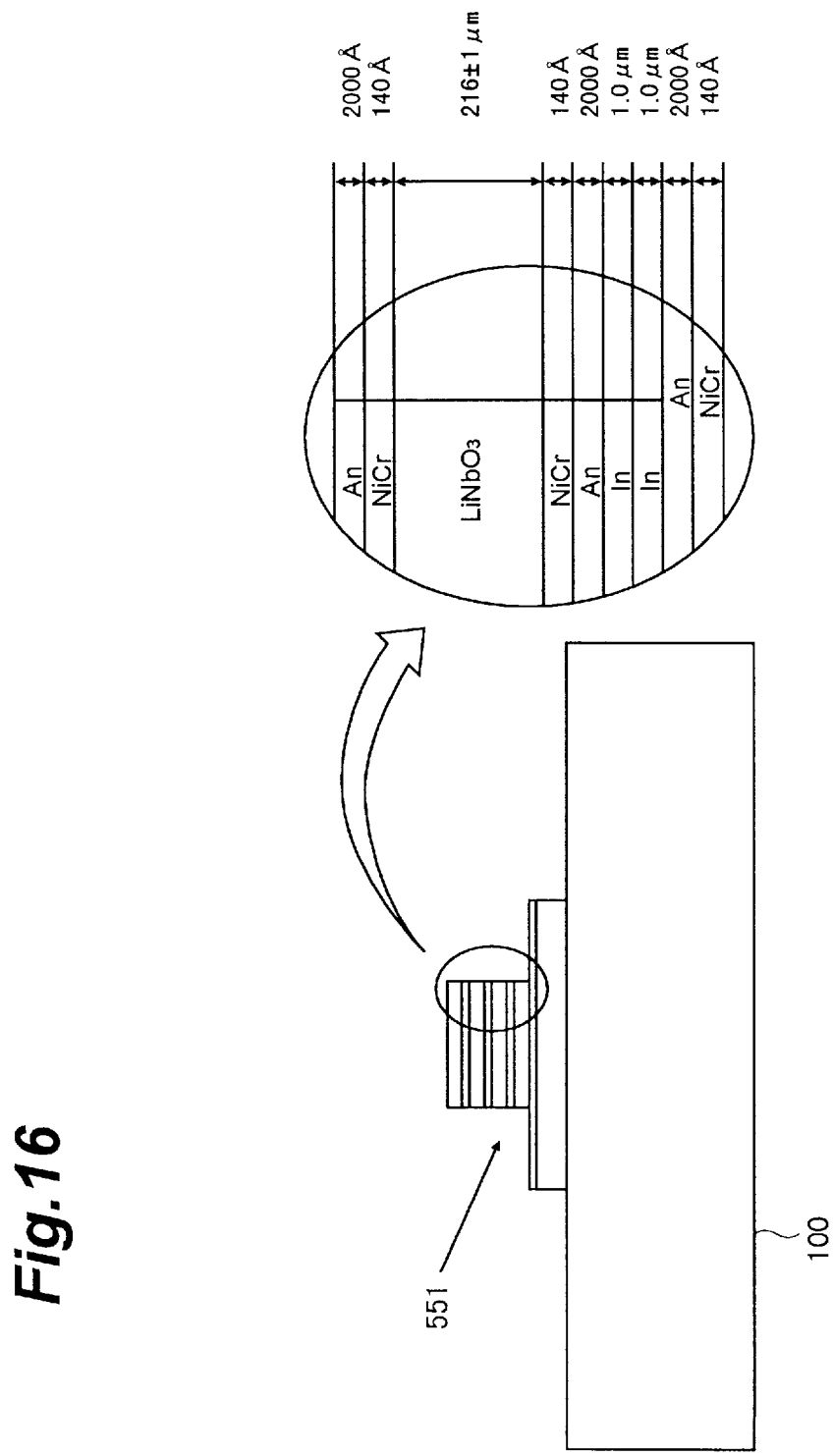
FIG. 16 is a sectional view showing the arrangement of an optical modulator serving as the pulse generation unit of the ultrashort pulse laser apparatus shown in FIG. 15.

FIG. 16 is a sectional view showing the structure of the transducer 551. As shown in FIG. 16, an LN (Lithium Niobate; LiNbO₃) layer is formed between multilayers consisting of NiCr, An, and In, thereby realizing a transducer function. A thickness d of the LN layer for satisfying the resonant condition is represented by equations (7) and (8):

$$d = \Lambda(2n+1)/2 \tag{7}$$

$$\Lambda = v//f \tag{8}$$

where

Λ: wavelength of an ultrasonic wave which travels through the LN layer v: speed of the ultrasonic wave in the LN layer along the travel direction f: frequency applied to the transducer n: integer When f=268 MHz, v=7.2×10⁵ cm/sec, and n=1, the thickness d of the LN layer is 216 μm.

In the apparatus of this embodiment, an excitation source 400 supplies an excitation energy to the laser medium 100. On the other hand, the variable modulation signal generation unit 552 supplies a modulation signal to the transducer 551. In this state, spontaneous emission occurs in the laser medium 100. The light propagates through the optical path in the laser resonator to cause stimulated emission while phase dispersion caused depending on the wavelength is compensated by a phase dispersion compensation unit 300.

Mode locking is started by the optical modulation function of the transducer 551 and the vibration of an output mirror 520, in addition to the Kerr lens effect of the laser medium 100. By adding the optical modulation function of the transducer 551 and the vibration of the output mirror 520, mode locking can be more easily and properly established than the apparatus shown in FIG. 1. In this manner, ultrashort pulses can be obtained by laser oscillation based on mode locking.

In the apparatus of this embodiment, a portion of the pulse generation unit arranged in the laser resonator is integrated with the laser medium in the resonator and therefore need not occupy an independent place in the resonator. Therefore, size reduction of the apparatus can be achieved.

13th Embodiment

Figure 17:
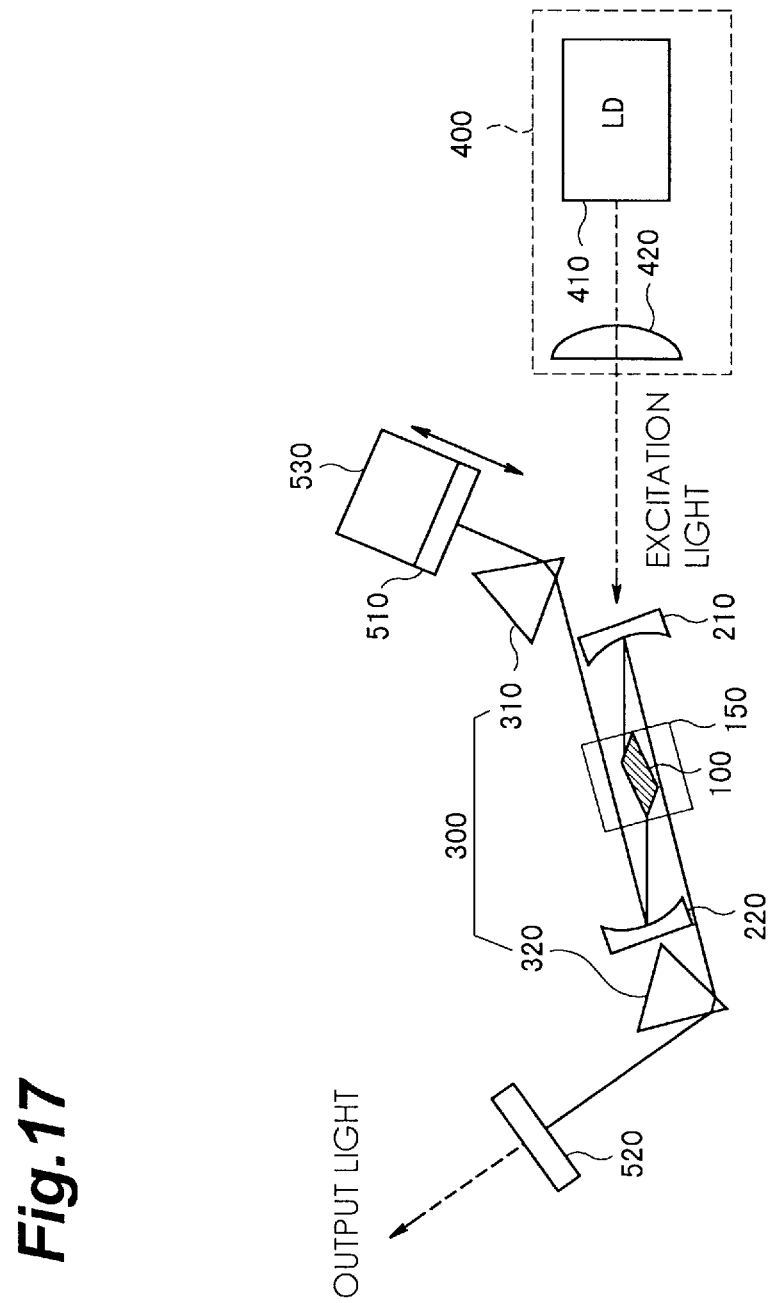
FIG. 17 is an optical path diagram showing the arrangement of an ultrashort pulse laser apparatus according to the 13th embodiment of the present invention.

FIG. 17 is a diagram showing an ultrashort pulse laser apparatus according to the present embodiment. As shown in FIG. 17, this apparatus is different from the second embodiment in that this apparatus further comprises a temperature adjustment mechanism 150 for adjusting the temperature of a laser medium 100 almost at a predetermined value.

Figure 18:
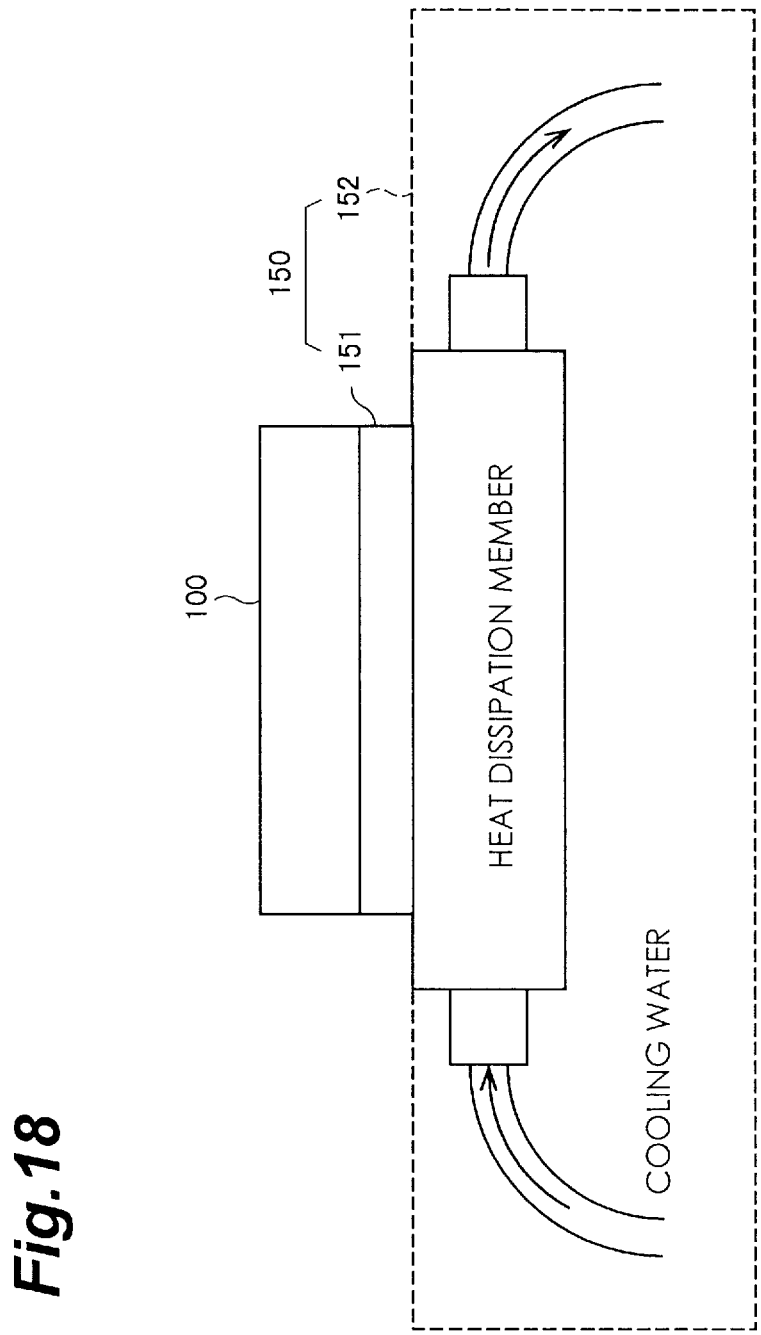
FIG. 18 is a sectional view showing the arrangement of the temperature adjustment mechanism of the ultrashort pulse laser apparatus shown in FIG. 17.

FIG. 18 is a sectional view showing the arrangement of the temperature adjustment mechanism 150. As shown in FIG. 18, the temperature adjustment mechanism 150 comprises, as a cooling unit, (i) a Peltier device 151 which tightly contacts the laser medium 100 to absorb the heat of the laser medium 100, and (ii) a heat dissipation member 152 which tightly contacts the Peltier device 151 to dissipate the heat from the Peltier device outside the laser resonator with the cooling water.

In the apparatus of this embodiment, laser oscillation is performed while maintaining the temperature of the laser medium 100 at an operation temperature suitable for the laser medium 100 (generally at a low temperature). As a result, ultrashort pulses having a stable intensity can be obtained.

14th Embodiment

Figure 19:
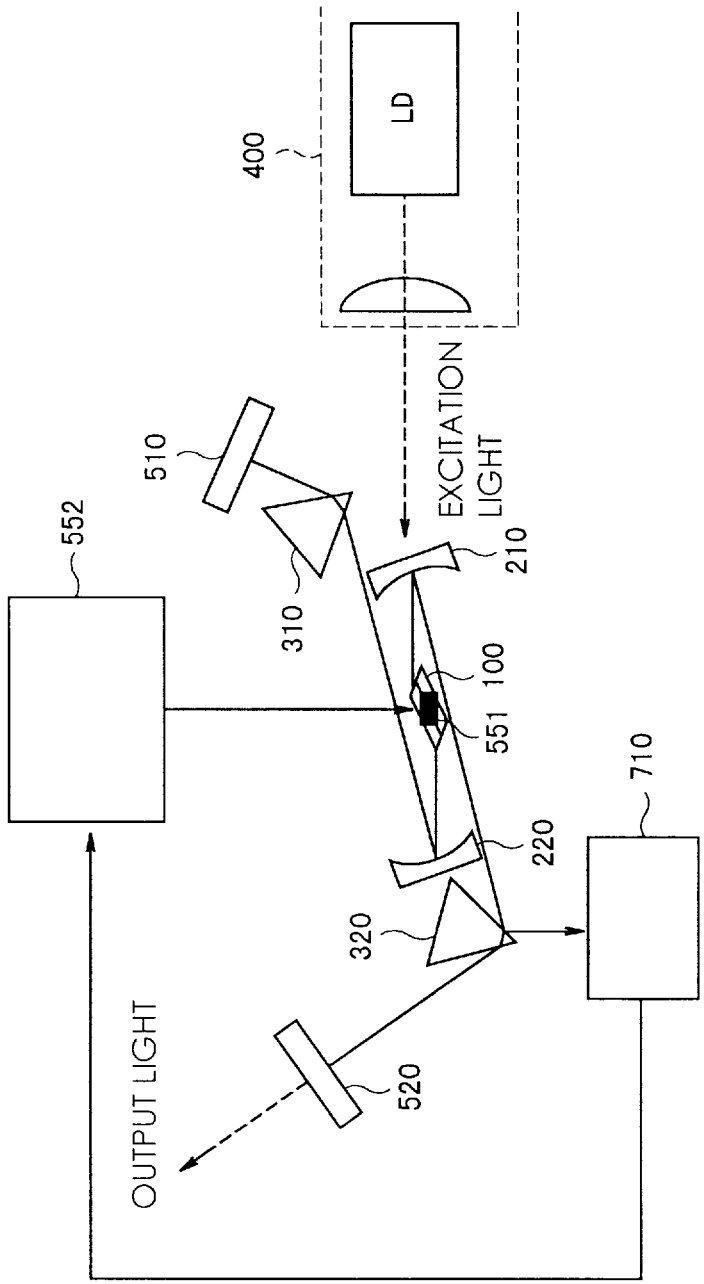
FIG. 19 is an optical path diagram showing the arrangement of an ultrashort pulse laser apparatus according to the 14th embodiment of the present invention.

FIG. 19 is a diagram showing an ultrashort pulse laser apparatus according to the present embodiment. As shown in FIG. 19, this apparatus is different from the 12th embodiment in that this apparatus further comprises a monitor unit 710 which monitors the mode locking state of the laser to designate a variable modulation signal generation unit 552 to stop optical modulation when mode locking of the laser is started, and designate the variable modulation signal generation unit 552 to start optical modulation when mode locking of the laser is canceled.

In this apparatus, ultrashort pulses are generated as in the 12th embodiment. By monitoring the mode locking state of the laser, when mode locking of the laser is started, optical modulation is stopped, and when mode locking is canceled, optical modulation is started to restart the mode locking state. Consequently, the mode-locked state can be kept stable, so that ultrashort pulses can be stably obtained.

The present invention is not limited to the above embodiments, and various changes and modifications can be made. For example, in the above embodiments, only Cr:L-iSAF is exemplified as a solid laser medium. However, any other solid medium may be used.

In the above embodiments, only Rhodamine 6G is exemplified as a dye laser medium, and only DQOCI and DODCI are exemplified as saturable absorbers. However, any other saturable absorber or dye laser medium may be used as far as the laser can generate ultrashort pluses on the basis of passive mode locking by using the dyes.

As has been described above in detail, according to the ultrashort pulse laser apparatus of the present invention, the laser medium is arranged in the optical path between the two optical members, e.g., a prism pair or a diffraction grating pair of the phase dispersion compensation unit. With this arrangement, even when the laser medium is arranged substantially at the center of the laser resonator to stabilize mode locking of the laser, the cavity length of the resonant optical path can be reduced. Therefore, the laser apparatus itself can be made compact, and at the same time, ultrashort pulses at a higher repetition frequency can be obtained.

In addition, when the resonant mirror is moved along the resonant optical path by the mirror moving unit attached to the resonant mirror, the cavity length of the resonant optical path is variably set. As a result, the repetition frequency of laser pulses can be variably set.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 68725/1996 filed on Mar. 25, 1996 is hereby incorporated by reference.

What is claimed is:

1. An ultrashort pulse laser apparatus comprising:
   a laser medium;
   a laser resonator which stores said laser medium and externally extracts a laser beam; and
   an excitation source for outputting an excitation energy to said laser resonator to excite said laser medium,
   wherein said laser resonator comprising:
      a plurality of resonant mirrors disposed on both sides of said laser medium to form a resonant optical path; and
      a phase dispersion compensation unit which includes two optical members respectively arranged on two light input/output surface sides of said laser medium on the resonant optical path and compensates phase dispersion of light in the resonant optical path.

2. An apparatus according to claim 1, wherein said plurality of resonant mirrors include an output coupling mirror for externally extracting the laser beam from said laser resonator and a high-reflectance mirror having a reflectance higher than that of said output coupling mirror with respect to the light in the resonant optical path.

3. An apparatus according to claim 1, wherein said phase dispersion compensation unit includes, as said two optical members, a pair of prisms or a pair of diffraction gratings arranged to separate the light in the resonant optical path into a plurality of wavelength components traveling in parallel.

4. An apparatus according to claim 1, wherein said laser resonator further comprises a mirror moving unit for moving at least one of said plurality of resonant mirrors along the resonant optical path to change a cavity length of the resonant optical path.

5. An apparatus according to claim 1, wherein said laser resonator further comprises a wavelength selection mechanism for extracting, as the laser beam, a predetermined wavelength components from the light of the resonant optical path.

6. An apparatus according to claim 5, wherein said wavelength selection mechanism includes a mirror rotation unit for changing an angle of a reflecting surface of at least one of said plurality of resonant mirrors with respect to the resonant optical path.

7. An apparatus according to claim 5, wherein said wavelength selection mechanism includes a slit arranged on the resonant optical path, and a slit moving unit for moving said slit along a direction perpendicular to the resonant optical path.

8. An apparatus according to claim 1, wherein said laser medium has a nonlinear optical effect and generates short pulses from the light in the resonant optical path on the basis of self-mode locking.

9. An apparatus according to claim 8, wherein said laser medium is a solid medium which has a Kerr lens effect as the nonlinear optical effect and generates the short pulses from the resonant optical path on the basis of Kerr lens mode locking as self-mode locking.

10. An apparatus according to claim 8, wherein at least one of said plurality of resonant mirrors includes a mirror vibration unit for initiating a mode locking.

11. An apparatus according to claim 10, wherein said ultrashort pulse laser apparatus further includes a monitor unit which monitors a mode locking state of the laser to designate said mirror vibration unit to stop vibration of said reflecting surface when mode locking of the laser is started, and designate said mirror vibration unit to start vibration of said reflecting surface when mode locking of the light is canceled.

12. An apparatus according to claim 1, wherein said laser resonator further comprises a pulse generation unit for generating short pulses from the light in the resonant optical path.

13. An apparatus according to claim 12, wherein said pulse generation unit is disposed in an optical path between said two optical member of said phase dispersion compensation unit.

14. An apparatus according to claim 12, wherein said pulse generation unit includes a saturable absorber having a nonlinear optical effect, which is arranged on the resonant optical path to generate the short pulses from the light in the resonant optical path on the basis of passive mode locking.

15. An apparatus according to claim 12, wherein said pulse generation unit includes an optical modulator integrated with said laser medium to modulate the light in the resonant optical path and generate the short pulses from the light in the resonant optical path on the basis of active mode locking, and a variable modulation signal generator for variably adjusting a modulation signal to be supplied to said optical modulator.

16. An apparatus according to claim 15, wherein said pulse generation unit further includes a monitor unit which monitors a mode locking state of the laser and stabilizes the mode locking condition on the basis of the signal generated from said variable modulation signal generator.

17. An apparatus according to claim 1, wherein said laser medium is a solid medium, and said excitation source is a semiconductor laser.

18. An apparatus according to claim 17, wherein said semiconductor laser has a master oscillator power amplifier structure.

19. An apparatus according to claim 1, wherein said laser resonator further comprises a temperature adjustment mechanism for holding a temperature of said laser medium substantially at a predetermined value.

20. An apparatus according to claim 19, wherein said temperature adjustment mechanism includes a cooling unit disposed in contact with said laser medium to absorb heat of said laser medium, and a heat dissipation member disposed in contact with said cooling unit to dissipate the heat from said cooling unit outside said laser resonator.

21. An apparatus according to claim 1, wherein said laser resonator has, as said plurality of resonant mirrors, two resonant mirrors arranged to form the resonant optical path as a Fabry-Pérot type optical path.

22. An apparatus according to claim 1, wherein said laser resonator comprises, as said plurality of resonant mirrors, at least three resonant mirrors arranged to form the resonant optical path as a ring-shaped optical path.

* * * * *